(12) United States Patent
Isurugi et al.

(10) Patent No.: US 9,512,535 B2
(45) Date of Patent: Dec. 6, 2016

(54) MOLD PRODUCTION METHOD

(75) Inventors: Akinobu Isurugi, Osaka (JP); Kiyoshi Minoura, Osaka (JP); Hiroyuki Sugawara, Miyagi (JP)

(73) Assignees: SHARP KABUSHIKI KAISHA, Osaka (JP); GEOMATEC CO., LTD., Kanagawa (JP)

( * ) Notice: Subject to any disclaimer, the term of this patent is extended or adjusted under 35 U.S.C. 154(b) by 580 days.

(21) Appl. No.: 14/008,649

(22) PCT Filed: Mar. 29, 2012

(86) PCT No.: PCT/JP2012/058394
§ 371 (c)(1),
(2), (4) Date: Sep. 30, 2013

(87) PCT Pub. No.: WO2012/137664
PCT Pub. Date: Oct. 11, 2012

(65) Prior Publication Data
US 2014/0197036 A1    Jul. 17, 2014

(30) Foreign Application Priority Data

Apr. 1, 2011 (JP) ................. 2011-081590

(51) Int. Cl.
*C25D 11/12* (2006.01)
*C25D 11/18* (2006.01)
(Continued)

(52) U.S. Cl.
CPC ............. *C25D 11/12* (2013.01); *B29C 33/38* (2013.01); *B29C 33/42* (2013.01); *C25D 1/10* (2013.01);
(Continued)

(58) Field of Classification Search
CPC .......... C25D 11/04; C25D 11/12; C25D 11/24
See application file for complete search history.

(56) References Cited

U.S. PATENT DOCUMENTS 6,359,735 B1    3/2002  Gombert et al.
RE43,694 E *   10/2012  Sawitowski .................. 164/138
(Continued)

FOREIGN PATENT DOCUMENTS

JP    2001517319 A    10/2001
JP    2003531962 A    10/2003
(Continued)

OTHER PUBLICATIONS

Machine Translation of JP 2005-232487A.*
(Continued)

*Primary Examiner* — Bryan D. Ripa
(74) *Attorney, Agent, or Firm* — Harness, Dickey & Pierce, P.L.C.

(57) ABSTRACT

A method for manufacturing a moth-eye mold of an embodiment of the present invention employs a mold base including a metal base, an organic insulating layer provided on the metal base, and an aluminum alloy layer provided on the organic insulating layer, the aluminum alloy layer containing aluminum and a non-aluminum metal element M, an absolute value of a difference between a standard electrode potential of the metal element M and a standard electrode potential of aluminum being not more than 0.64 V, and a content of the metal element M in the aluminum alloy layer not exceeding 10 mass %.

9 Claims, 11 Drawing Sheets

(51) Int. Cl.
  *B29C 33/38* (2006.01)
  *B29C 33/42* (2006.01)
  *C25D 1/10* (2006.01)
  *C25D 11/04* (2006.01)
  *C25D 11/24* (2006.01)
  *G02B 1/118* (2015.01)
  *B29C 59/04* (2006.01)
  *B29C 35/08* (2006.01)

(52) U.S. Cl.
  CPC ............ *C25D 11/04* (2013.01); *C25D 11/045* (2013.01); *C25D 11/24* (2013.01); *G02B 1/118* (2013.01); *B29C 59/046* (2013.01); *B29C 2035/0827* (2013.01)

(56) References Cited

U.S. PATENT DOCUMENTS

| | | | |
|---|---|---|---|
| 2003/0205475 A1 | 11/2003 | Sawitowski | |
| 2007/0159698 A1* | 7/2007 | Taguchi | G02B 1/118 359/586 |
| 2009/0034122 A1 | 2/2009 | Ichihara et al. | |
| 2010/0086733 A1 | 4/2010 | Nakata | |
| 2010/0283165 A1 | 11/2010 | Ihara | |
| 2011/0100827 A1* | 5/2011 | Hayashi | G02B 5/0215 205/112 |
| 2012/0018613 A1* | 1/2012 | Hayashi | B29C 33/38 249/114.1 |
| 2012/0043297 A1* | 2/2012 | Fujii | B29C 33/38 216/11 |
| 2013/0004612 A1 | 1/2013 | Isurugi et al. | |
| 2013/0094089 A1* | 4/2013 | Isurugi | B29C 33/424 359/601 |

FOREIGN PATENT DOCUMENTS

| | | | | |
|---|---|---|---|---|
| JP | 2005156695 A | | 6/2005 | |
| JP | 2005-232487 A | | 9/2005 | |
| JP | 2005232487 A | * | 9/2005 | |
| JP | WO 2006059686 A1 | * | 6/2006 | ............ G02B 1/118 |
| JP | 2009-037706 A | | 2/2009 | |
| JP | 2010-090430 A | | 4/2010 | |
| JP | WO 2010125795 A1 | * | 11/2010 | ............ B29C 33/38 |
| JP | WO 2011135976 A1 | * | 11/2011 | ........... B29C 33/424 |
| WO | WO-2006059686 A1 | | 6/2006 | |
| WO | WO-2010043297 A1 | | 4/2010 | |
| WO | WO-2010073636 A1 | | 7/2010 | |
| WO | WO-2010116728 A1 | | 10/2010 | |
| WO | WO-2010125795 A1 | | 11/2010 | |
| WO | WO-2011/105206 A1 | | 9/2011 | |

OTHER PUBLICATIONS

International Search Report PCT/ISA/210 for PCT/JP2012/058394 dated Jul. 10, 2012.
International Preliminary Report on Patentability dated Nov. 14, 2013.

* cited by examiner (a)

(b)

(a)

(b)

(c)

(d)

(e)

(a)

(b)

(a)  (b)

(a)

(b)

(a)          (b)

Al$^{3+}$ + 3e$^-$ = Al − 1.676V     Ti$^{2+}$ + 2e$^-$ = Ti − 1.63V
Nd$^{3+}$ + 3e$^-$ = Nd − 2.32V     Cu$^{2+}$ + 2e$^-$ = Cu + 0.34V
Fe$^{2+}$ + 2e$^-$ = Fe − 0.44V     SiO + 2H$^+$ + 2e$^-$ = Si +H$_2$O − 0.808V
Mg$^+$ + e$^-$ = Mg − 2.657V     Mg$^{2+}$ + 2e$^-$ = Mg − 2.356V
Mn$^{2+}$ + 2e$^-$ = Mn − 1.18V     Ni$^{2+}$ + 2e$^-$ = Ni − 0.257V
Zn$^{2+}$ + 2e$^-$ = Zn − 0.762V     Zr$^{4+}$ + 4e$^-$ = Fe − 1.55V
Cr$^{2+}$ + 2e$^-$ = Cr − 0.90V     Bi$^{3+}$ + 3e$^-$ = Bi + 0.317V
Pb$^{2+}$ + 2e$^-$ = Pb − 0.126V     V$^{2+}$ + 2e$^-$ = V − 1.13V

MOLD PRODUCTION METHOD

TECHNICAL FIELD

The present invention relates to a mold manufacturing method and particularly to a mold which has a porous alumina layer over its surface. In this specification, the "mold" includes molds that are for use in various processing methods (stamping and casting), and is sometimes referred to as a stamper. The "mold" can also be used for printing (including nanoimprinting).

BACKGROUND ART

Display devices for use in TVs, cell phones, etc., and optical elements, such as camera lenses, etc., usually adopt an antireflection technique in order to reduce the surface reflection and increase the amount of light transmitted therethrough. This is because, when light is transmitted through the interface between media of different refractive indices, e.g., when light is incident on the interface between air and glass, the amount of transmitted light decreases due to, for example, Fresnel reflection, thus deteriorating the visibility.

An antireflection technique which has been receiving attention in recent years is forming over a substrate surface a very small uneven pattern in which the interval of recessed portions or raised portions is not more than the wavelength of visible light ($\lambda$=380 nm to 780 nm). See Patent Documents 1 to 4. The two-dimensional size of a raised portion of an uneven pattern which performs an antireflection function is not less than 10 nm and less than 500 nm.

This method utilizes the principles of a so-called moth-eye structure. The refractive index for light that is incident on the substrate is continuously changed along the depth direction of the recessed portions or raised portions, from the refractive index of a medium on which the light is incident to the refractive index of the substrate, whereby reflection of a wavelength band that is subject to antireflection is prevented.

The moth-eye structure is advantageous in that it is capable of performing an antireflection function with small incident angle dependence over a wide wavelength band, as well as that it is applicable to a number of materials, and that an uneven pattern can be directly formed in a substrate. As such, a high-performance antireflection film (or antireflection surface) can be provided at a low cost.

As the method of forming a moth-eye structure, using an anodized porous alumina layer which is obtained by means of anodization of aluminum has been receiving attention (Patent Documents 2 to 4).

Now, the anodized porous alumina layer which is obtained by means of anodization of aluminum is briefly described. Conventionally, a method of forming a porous structure by means of anodization has been receiving attention as a simple method for making nanometer-scale micropores (very small recessed portions) in the shape of a circular column in a regular arrangement. An aluminum base is immersed in an acidic electrolytic solution of sulfuric acid, oxalic acid, phosphoric acid, or the like, or an alkaline electrolytic solution, and this is used as an anode in application of a voltage, which causes oxidation and dissolution. The oxidation and the dissolution concurrently advance over a surface of the aluminum base to form an oxide film which has micropores over its surface. The micropores, which are in the shape of a circular column, are oriented vertical to the oxide film and exhibit a self-organized regularity under certain conditions (voltage, electrolyte type, temperature, etc.). Thus, this anodized porous alumina layer is expected to be applied to a wide variety of functional materials.

A porous alumina layer formed under specific conditions includes cells in the shape of a generally regular hexagon which are in a closest packed two-dimensional arrangement when seen in a direction perpendicular to the film surface. Each of the cells has a micropore at its center. The arrangement of the micropores is periodic. The cells are formed as a result of local dissolution and growth of a coating. The dissolution and growth of the coating concurrently advance at the bottom of the micropores which is referred to as a barrier layer. As known, the interval between adjacent micropores (the distance between the centers), is approximately twice the thickness of the barrier layer, and is approximately proportional to the voltage that is applied during the anodization. It is also known that the diameter of the micropores depends on the type, concentration, temperature, etc., of the electrolytic solution but is, usually, about ⅓ of the size of the cells (the length of the longest diagonal of the cell when seen in a direction vertical to the film surface). Such micropores of the porous alumina may constitute an arrangement which has a high regularity (periodicity) under specific conditions, an arrangement with a regularity degraded to some extent depending on the conditions, or an irregular (non-periodic) arrangement.

Patent Document 2 discloses a method of producing an antireflection film (antireflection surface) with the use of a stamper which has an anodized porous alumina film over its surface.

Patent Document 3 discloses the technique of forming tapered recesses with continuously changing pore diameters by repeating anodization of aluminum and a pore diameter increasing process.

The applicant of the present application discloses, in Patent Document 4, the technique of forming an antireflection film with the use of an alumina layer in which very small recessed portions have stepped lateral surfaces.

As described in Patent Documents 1, 2, and 4, by providing an uneven structure (macro structure) which is greater than a moth-eye structure (micro structure) in addition to the moth-eye structure, the antireflection film (antireflection surface) can be provided with an antiglare function. The two-dimensional size of a raised portion of the uneven structure which is capable of performing the antiglare function is not less than 1 μm and less than 100 μm.

Utilizing an anodized porous aluminum film can facilitate the manufacture of a mold which is used for formation of a moth-eye structure over a surface (hereinafter, "moth-eye mold"). In particular, as described in Patent Documents 2 and 4, when the surface of the anodized aluminum film as formed is used as a mold without any modification, a large effect of reducing the manufacturing cost is achieved. The structure of the surface of a moth-eye mold which is capable of forming a moth-eye structure is herein referred to as "inverted moth-eye structure".

A known antireflection film production method with the use of a moth-eye mold uses a photocurable resin. Firstly, a photocurable resin is applied over a substrate. Then, an uneven surface of a moth-eye mold which has undergone a mold release treatment is pressed against the photocurable resin in vacuum, whereby the uneven structure at the surface of the moth-eye mold is filled with the photocurable resin. Then, the photocurable resin in the uneven structure is irradiated with ultraviolet light so that the photocurable resin is cured. Thereafter, the moth-eye mold is separated from the substrate, whereby a cured layer of the photocurable resin to which the uneven structure of the moth-eye mold has been transferred is formed over the surface of the substrate. The method of producing an antireflection film with the use of the photocurable resin is disclosed in, for example, Patent Document 4.

The above-described moth-eye mold can be fabricated using an aluminum base, such as typically a substrate made of aluminum or a cylinder made of aluminum, or an aluminum film formed on a support that is made of a non-aluminum material, such as typically a glass substrate. However, in a moth-eye mold manufactured using an aluminum film formed on a glass substrate or plastic film, the adhesive property between the aluminum film (part of which is an anodized film) and the glass substrate or plastic film deteriorates in some cases. The applicant of the present application found that, by forming an inorganic underlayer (e.g., $SiO_2$ layer) and a buffer layer containing aluminum (e.g., $AlO_x$ layer) on a surface of a base which is made of glass or plastic, the above-described deterioration of the adhesive property is prevented. This is disclosed in Patent Document 5.

The applicant of the present application developed a method for efficiently producing an antireflection film using a moth-eye mold in the form of a cylinder (roll) according to a roll-to-roll method (e.g., WO 2011/105206). The moth-eye mold in the form of a cylinder can be formed by, for example, forming an organic insulating layer over an outer perimeter surface of a metal cylinder, forming an aluminum film on this organic insulating layer, and alternately and repeatedly performing anodization and etching on the aluminum film. In this case also, the adhesive property can be improved by forming the inorganic underlayer and the buffer layer disclosed in Patent Document 5.

The entire disclosures of Patent Documents 1, 2, 4, and 5 are herein incorporated by reference.

CITATION LIST

Patent Literature

Patent Document 1: Japanese PCT National Phase Laid-Open Publication No. 2001-517319
Patent Document 2: Japanese PCT National Phase Laid-Open Publication No. 2003-531962
Patent Document 3: Japanese Laid-Open Patent Publication No. 2005-156695
Patent Document 4: WO 2006/059686
Patent Document 5: WO 2010/116728
Patent Document 6: WO 2010/073636

SUMMARY OF INVENTION

Technical Problem

However, according to further researches carried out by the present inventors, an aluminum film formed on an organic insulating layer contains abnormal grains in many cases. The abnormal grains are formed by abnormal growth of a crystal of aluminum. The aluminum film is an aggregation of crystal grains whose average grain diameter (average grain size) is about 200 nm. On the other hand, the grain diameter of the abnormal grains is larger than the average grain diameter, e.g., not less than 500 nm in some cases. The organic insulating layer has a lower thermal conductivity than the other materials (metal materials and inorganic insulating films), and therefore, the aluminum film readily reaches a relatively high temperature in the process of depositing the aluminum film (e.g., sputtering or vapor deposition). As a result, it is inferred that abnormal growth of crystal grains is likely to occur, i.e., abnormal grains are likely to be produced. Note that such a phenomenon can also occur when an aluminum film is directly deposited on a surface of an aluminum pipe (e.g., the thickness is not less than 1 mm).

When a moth-eye mold is manufactured using an aluminum film in which abnormal grains are present, structures corresponding to the abnormal grains are formed in the surface of a porous alumina layer of the moth-eye mold. When an antireflection film is formed using such a moth-eye mold, the structures corresponding to the abnormal grains are transferred to the surface of the antireflection film. Therefore, light is scattered by the structures transferred to the surface of the antireflection film which are attributed to the abnormal grains. That is, the antireflection film has a haze. In the case where the antireflection film is provided with an antiglare function as described above, no problem occurs in some cases even when the antireflection film has a haze which is attributed to the abnormal grains. However, there is such a problem that an antireflection film which does not have an antiglare function cannot be producing. Further, it is difficult to control the formation density (frequency of occurrence) of abnormal grains, and therefore, from the viewpoint of mass productivity, preventing production of abnormal grains is preferred.

The present invention was conceived for the purpose of solving the above problems. The major objects of the present invention include reducing the probability of production of abnormal grains in an aluminum film in a mold manufacturing method in which the aluminum film is used, and providing a method for manufacturing a mold that is capable of forming an antireflection film which does not have an undesirable haze. Particularly, one of the major objects of the present invention is to reduce the probability of production of abnormal grains in an aluminum film formed on an organic insulating film in a mold manufacturing method in which the aluminum film is used.

Solution to Problem

A mold manufacturing method of an embodiment of the present invention is a method for manufacturing a mold which has an inverted moth-eye structure over its surface, the inverted moth-eye structure having a plurality of recessed portions whose two-dimensional size viewed in a direction normal to its surface is not less than 10 nm and less than 500 nm, the method including the steps of: (a) providing a mold base, the mold base including a metal base, an organic insulating layer provided on the metal base, and an aluminum alloy layer provided on the organic insulating layer, the aluminum alloy layer containing aluminum and a non-aluminum metal element M, an absolute value of a difference between a standard electrode potential of the metal element M and a standard electrode potential of aluminum being not more than 0.64 V, and a content of the metal element M in the aluminum alloy layer not exceeding 10 mass %; (b) partially anodizing the aluminum alloy layer to form a porous alumina layer which has a plurality of minute recessed portions; (c) after step (b), bringing the porous alumina layer into contact with an etching solution, thereby enlarging the plurality of minute recessed portions of the porous alumina layer; and (d) after step (c), further performing anodization to grow the plurality of minute recessed portions. Note that the mold base provided in step (a) may include a metal base (e.g., aluminum pipe) and an aluminum alloy layer directly provided on the metal base.

In one embodiment, the metal element M is a metal element which is nobler than aluminum (i.e., a metal element which has a small ionization tendency, e.g., Ti).

In one embodiment, the metal element M is a metal element which is less noble than aluminum (i.e., a metal element which has a large ionization tendency, e.g., Nd).

In one embodiment, the mold base further includes an inorganic underlayer interposed between the organic insulating layer and the aluminum alloy layer.

In one embodiment, the mold base further includes a buffer layer interposed between the inorganic underlayer and the aluminum alloy layer, the buffer layer containing aluminum, the metal element M, and either of oxygen or nitrogen. In one embodiment, the thickness of the buffer layer is preferably not less than 10 nm and not more than 500 nm.

In one embodiment, the buffer layer has such a profile that the contents of aluminum and the metal element M in the buffer layer are higher in a portion which is closer to the aluminum alloy layer than in another portion which is closer to the inorganic underlayer.

In one embodiment, the inorganic underlayer is a silicon oxide layer or a titanium oxide layer. In one embodiment, the thickness of the inorganic underlayer is preferably not less than 50 nm and not more than 300 nm.

In one embodiment, the organic insulating layer is an electrodeposition layer.

In one embodiment, the metal base is in the form of a hollow cylinder, and the organic insulating layer is provided over an outer perimeter surface of the hollow cylinder of the metal base.

In one embodiment, step (b) and step (c) are further performed after step (d).

Advantageous Effects of Invention

According to an embodiment of the present invention, in a mold manufacturing method in which an aluminum film is used, the probability of production of abnormal grains in the aluminum film can be reduced, and furthermore, a method for manufacturing a mold that is capable of forming an antireflection film which does not have an undesirable haze is provided.

DESCRIPTION OF EMBODIMENTS

Hereinafter, a mold manufacturing method according to an embodiment of the present invention is described with reference to the drawings. The mold of the present embodiment is a moth-eye mold which has an inverted moth-eye structure over its surface, the inverted moth-eye structure having a plurality of recessed portions whose two-dimensional size viewed in the normal direction of the surface is not less than 10 nm and less than 500 nm.

Figure 1:
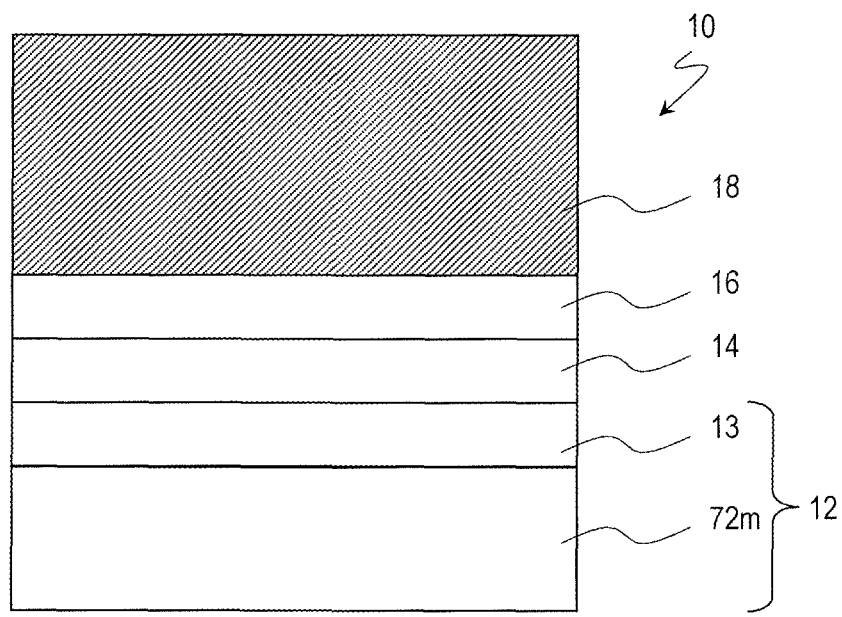
FIG. 1 (a) is a schematic diagram showing a mold base 10 for use in manufacture of a mold of an embodiment of the present invention. (b) is a schematic diagram showing a moth-eye mold 100 manufactured using the mold base 10.
Figure 1:
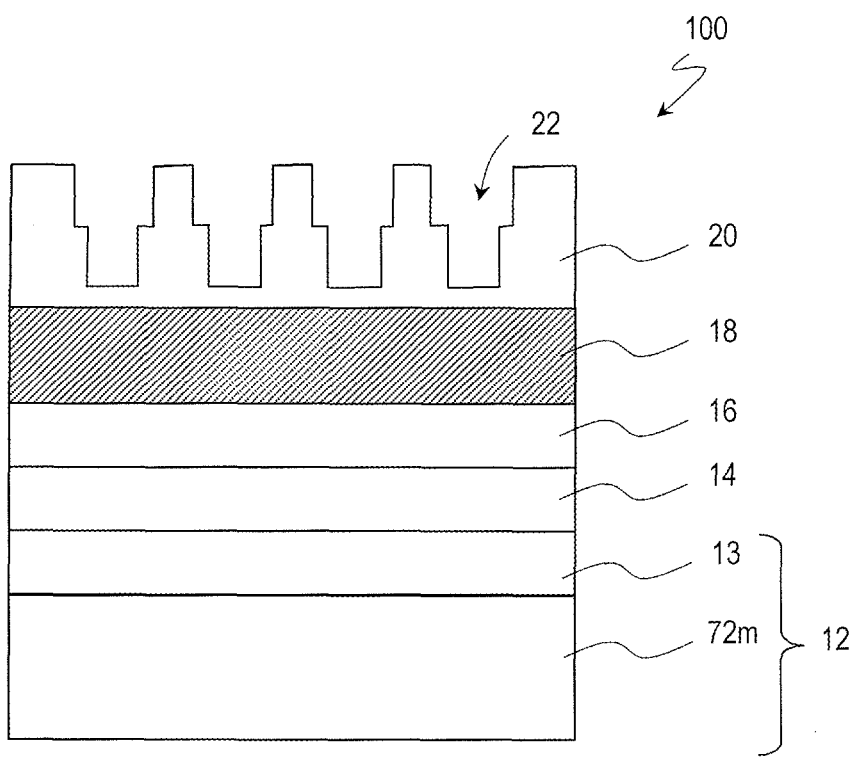

The mold manufacturing method of the embodiment of the present invention includes the step of preparing a mold base 10 which includes a metal base 72m, an organic insulating layer 13 formed on the metal base 72m, and an aluminum alloy layer 18 formed on the organic insulating layer 13 as shown in FIG. 1(a). The metal base 72m and the organic insulating layer 13 are sometimes integrally referred to as "support 12".

Figure 19:
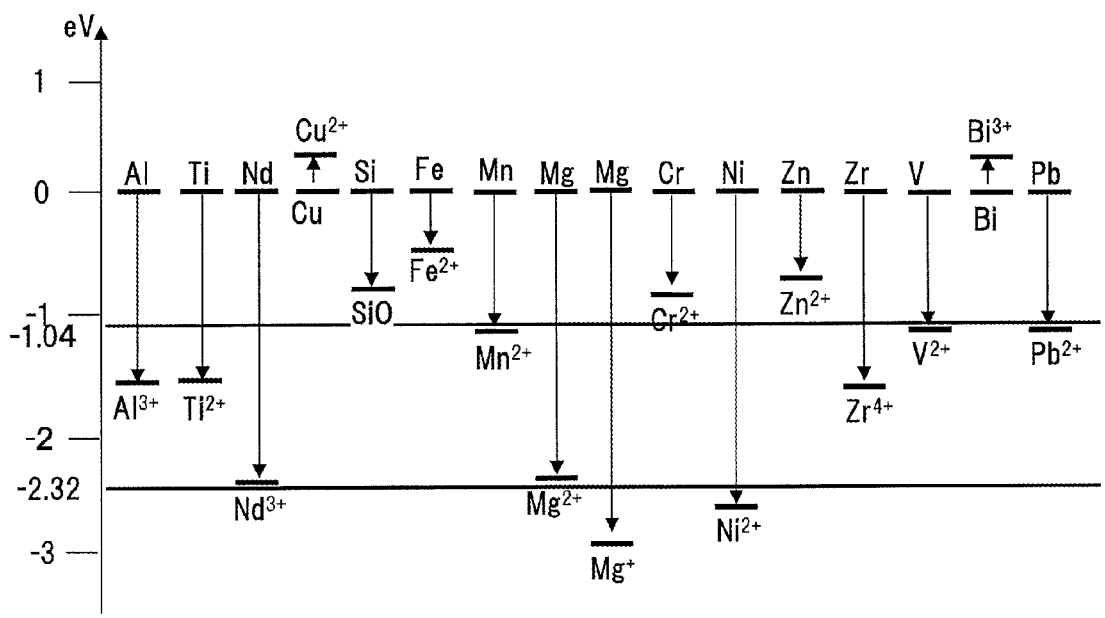
FIG. 19 A diagram showing the standard electrode potential of the metal elements.

Here, the aluminum alloy layer 18 contains aluminum and a non-aluminum metal element M. The absolute value of the difference between the standard electrode potential of the metal element M and the standard electrode potential of aluminum is not more than 0.64 V. The content of the metal element M in the aluminum alloy layer 18 does not exceed 10 mass %. The metal element M may be a metal element which is nobler than aluminum (i.e., a metal element which has a small ionization tendency, e.g., Ti) or may be a metal element which is less noble than aluminum (i.e., a metal element which has a large ionization tendency, e.g., Nd). Examples of a metal element of which the absolute value of the difference from the standard electrode potential of aluminum is not more than 0.64 V include Ti, Nd, Mn, Mg, Zr, V, and Pb as shown in FIG. 19. Here, a target of an aluminum alloy which contains Ti, Nd, and Zr is commercially distributed and is readily available. Note that FIG. 19 is based on Rikagaku-jiten (Iwanami Shoten, Publishers).

As will be described later with the illustration of an experimental example, the aluminum alloy layer 18 which contains the above-described metal element M has a reflectance of not less than 80% in the wavelength range of 400 nm to 700 nm. That is, containment of the metal element M prevents abnormal growth of crystal grains of aluminum, and as a result, the aluminum alloy layer 18 scarcely contains abnormal grains. Therefore, by forming the moth-eye mold 100 which has a porous alumina layer 20 such as shown in FIG. 1(b) with the use of the aluminum alloy layer 18, a mold 100 can be obtained which is capable of forming an antireflection film that does not have an undesirable haze (a haze-free antireflection film or a haze-controlled antireflection film).

What should be particularly mentioned herein is that, even when the anodization step and the etching step are alternately and repeatedly performed on the aluminum alloy layer 18 for the purpose of forming a moth-eye mold with the use of the aluminum alloy layer 18, galvanic corrosion would not occur in the etching step.

The applicant of the present application discloses in Patent Document 6 a method for manufacturing a moth-eye mold with the use of an aluminum base (aluminum in a bulk form which is self-supporting and which is in the shape of a plate having a thickness of not less than 2 mm or in the shape of a hollow or solid cylinder). As described in Patent Document 6, in the case where the aluminum base contains an impurity element, when the aluminum base comes into contact with an etching solution, galvanic corrosion (local cell reaction) occurs so that pits (recesses) are formed. The pits are greater than minute recessed portions that the porous alumina layer intrinsically has and can be a cause of generation of a haze in the antireflection film. Patent Document 6 discloses that, from the viewpoint of preventing this problem, it is preferred to use an aluminum base which does not at all contain an element nobler than aluminum and which contains Mg that is a metal less noble than aluminum as an impurity element.

Thus, it was an unexpected result for the present inventors that, when the aluminum alloy layer 18 containing the above-described metal element M was used, galvanic corrosion did not occur (at least pits did not formed) in the etching step. Note that the present inventors consider that the above-described mutually inconsistent results are attributed to the difference in existence form of the impurity element. That is, in an aluminum base which is in a bulk form, the impurity element is segregated at the grain boundary of aluminum. On the other hand, in the aluminum alloy layer 18, the metal element M is almost solid-dissolved in aluminum. As a result, it is considered that, even when the aluminum alloy layer 18 comes into contact with the etching solution, galvanic corrosion would not occur. Although Patent Document 6 discloses that formation of pits can be prevented by mixing an anode inhibitor into the etching solution, a mold manufacturing method of an embodiment of the present invention assures that pits would not be generated even when an anode inhibitor is not mixed into the etching solution.

The aluminum alloy layer 18 used in the embodiment of the present invention is formed by a known method (e.g., electron beam deposition or sputtering) in the same way as a conventional aluminum layer which is formed using aluminum of high purity (with the purity of not less than 99.99 mass %). The thickness of the aluminum alloy layer 18 is preferably not less than 100 nm for the purpose of obtaining an anodized alumina layer which has a surface structure that serves as a moth-eye mold. From the viewpoint of productivity, the thickness of the aluminum alloy layer 18 is preferably not more than 3000 nm. Typically, the thickness of the aluminum alloy layer 18 is about 1000 nm (1 μm). Here, the aluminum alloy layer 18 having a thickness of about 1 μm is preferably formed through a plurality of separate cycles rather than formed at once in one cycle. Specifically, it is preferred to repeat the cycle of depositing aluminum to a certain thickness before an intermission of a certain time period and resuming the deposition after the intermission till the aluminum alloy layer 18 having a predetermined thickness (e.g., 1 μm) is obtained, rather than to continuously deposit aluminum to the predetermined thickness. For example, it is preferred that the aluminum alloy layer 18 having a thickness of about 1 μm is obtained by forming 20 aluminum alloy layers each of which has a thickness of 50 nm in such a manner that every formation of the 50 nm thick aluminum alloy layer is followed by an intermission. In this way, the deposition of the aluminum alloy is carried out in a plurality of separate cycles, whereby the quality of the finally-obtained aluminum alloy layer 18 (e.g., the chemical resistance or adhesion) can be improved. This is probably because continuous deposition of the aluminum alloy increases the temperature of a base (a base having a surface on which the aluminum layer is to be formed), and as a result, the distribution of thermal stress in the aluminum alloy layer 18 becomes nonuniform so that the film quality deteriorates.

Here, it is preferred to provide an inorganic underlayer 14 between the organic insulating layer 13 and the aluminum alloy layer 18 as in the mold base 10 shown in FIG. 1(a). The inorganic underlayer 14 is directly provided on a surface of the organic insulating layer 13 and functions to improve adhesion between the organic insulating layer 13 and the aluminum alloy layer 18. The inorganic underlayer 14 is preferably made of an inorganic oxide or an inorganic nitride. When an inorganic oxide is used, for example, the inorganic underlayer 14 is preferably a silicon oxide layer or a titanium oxide layer. When an inorganic nitride is used, for example, the inorganic underlayer 14 is preferably a silicon nitride layer. Further, the thermal expansion coefficient of the inorganic underlayer 14 may be adapted by adding an impurity to the inorganic oxide layer or inorganic nitride layer. For example, when a silicon oxide layer is used, the thermal expansion coefficient can be increased by adding germanium (Ge), phosphorus (P), or boron (B).

The thickness of the inorganic underlayer 14 is preferably not less than 40 nm and, more preferably, not less than 100 nm. When the thickness of the inorganic underlayer is less than 40 nm, the effects of provision of the inorganic underlayer 14 are not sufficiently produced in some cases. The thickness of the inorganic underlayer 14 is preferably not more than 500 nm and, more preferably, not more than 200 nm. If the thickness of the inorganic underlayer 14 is more than 500 nm, the time required for formation of the inorganic underlayer 14 will be unduly long. When the inorganic underlayer 14 is formed on a curved surface or a flexible surface, cracks are more likely to be caused as the thickness of the inorganic underlayer 14 increases.

Preferably, the mold base 10 further includes a buffer layer 16 interposed between the inorganic underlayer 14 and the aluminum alloy layer 18. The buffer layer 16 has the function of improving the adhesive property between the inorganic underlayer 14 and the aluminum alloy layer 18. In the example described herein, the buffer layer 16 is directly provided on the inorganic underlayer 14, although the present invention is not limited to this example. For example, when an electrically-conductive layer (preferably, a valve metal layer) is provided as a backing in order to uniformly anodize the aluminum alloy layer 18, the electrically-conductive layer may be provided between the inorganic underlayer 14 and the buffer layer 16 or between the buffer layer 16 and the aluminum alloy layer 18.

The buffer layer 16 preferably contains aluminum, the metal element M, and either of oxygen or nitrogen. The buffer layer 16 preferably has such a profile that the contents of aluminum and the metal element M are higher in a portion which is closer to the aluminum alloy layer 18 than in another portion which is closer to the inorganic underlayer 14, although the oxygen or nitrogen content may be uniform. This is because the property values, such as the thermal expansion coefficient, exhibit excellent conformity. The thickness of the buffer layer 16 is preferably not less than 10 nm and, more preferably, not less than 20 nm. The thickness of the buffer layer 16 is preferably not more than 500 nm and, more preferably, not more than 200 nm. If the thickness of the buffer layer 16 is less than 10 nm, sufficient adhesion is not achieved between the inorganic underlayer 14 and the aluminum alloy layer 18 in some cases. If the thickness of the buffer layer 16 is more than 500 nm, the time required for formation of the buffer layer 16 will be unduly long. Thus, this case is not preferred.

The profile of the aluminum content in the buffer layer 16 along the thickness direction may vary stepwise or may continuously vary. For example, when the buffer layer 16 is formed of aluminum, the metal element M, and oxygen, a plurality of aluminum oxide alloy layers which have gradually decreasing oxygen contents are formed, and then, the aluminum alloy layer 18 is formed on the uppermost aluminum oxide alloy layer. The highest oxygen content in the buffer layer 16 is preferably not more than 60 at %. This also applies to a case where the buffer layer 16 formed contains nitrogen instead of oxygen.

The moth-eye mold 100 shown in FIG. 1(b) can be obtained by performing: the step of partially anodizing the aluminum alloy layer 18 with the use of the mold base 10 shown in FIG. 1(a) in the same way as the conventional method, thereby forming the porous alumina layer 20 which has a plurality of minute recessed portions 22; thereafter, the step of bringing the porous alumina layer 20 into contact with an etching solution, thereby enlarging the plurality of minute recessed portions 22 of the porous alumina layer 20, and thereafter, the step of further performing anodization to grow the plurality of minute recessed portions 22.

The moth-eye mold 100 is suitably used in production of an antireflection film (antireflection surface). The cross-sectional shape of the minute recessed portions (micropores) 22 of the porous alumina layer 20 that is to be used in production of an antireflection film is generally conical. As overdrawn in FIG. 1(b), the minute recessed portions 22 may have a stepped lateral surface. It is preferred that the two-dimensional size of the minute recessed portions 22 (opening diameter: $D_p$) is not less than nm and less than 500 nm, and the depth of the minute recessed portions 22 (n depth) is generally not less than 10 nm and less than 1000 nm (1 µm). It is also preferred that the bottom portion of the minute recessed portions 22 is tapered (with the deepest part of the bottom portion being pointed). Further, it is preferred that the minute recessed portions 22 are in a closely packed arrangement. Assuming that the shape of the minute recessed portions 22 of the porous alumina layer 20 when viewed in a direction normal to the porous alumina layer 20 is a circle, it is preferred that adjacent circles overlap each other, and a saddle portion is formed between adjacent ones of the minute recessed portions 22. Note that, when the generally-conical minute recessed portions 22 adjoin one another so as to form saddle portions, the two-dimensional size of the minute recessed portions 22, $D_p$, is equal to the average adjoining distance $D_{int}$. Thus, the porous alumina layer 20 of the moth-eye mold 100 that is for production of the antireflection film preferably has a configuration in which the minute recessed portions 22 are in an irregular closely-packed arrangement, the minute recessed portions 22 having such dimensions that $D_p = D_{int}$ is not less than 10 nm and less than 500 nm and D depth is generally not less than 10 nm and less than 1000 nm (1 µm). Note that, strictly speaking, the shape of the openings of the minute recessed portions 22 is not a circle. $D_p$ is preferably determined from the SEM image of the surface. The thickness of the porous alumina layer 20, $t_p$, is not more than about 1 µm.

Hereinafter, a method for manufacturing a roll-shaped mold with the use of a mold base in the shape of a hollow cylinder is described.

The roll-shaped mold was manufactured by a method disclosed in WO 2011/105206 of the applicant of the present application. Here, a metal sleeve which was made of stainless steel or nickel was used. Note that the metal sleeve refers to a hollow cylinder which is made of a metal and which has a thickness of not less than 0.02 mm and not more than 1.0 mm. The entire disclosures of WO 2011/105206 are herein incorporated by reference.

Figure 2:
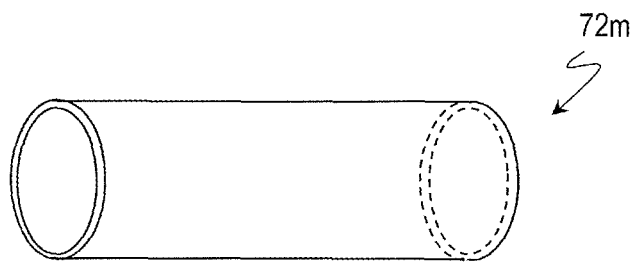
FIG. 2 (a) to (e) are diagrams showing the steps of a method for manufacturing a roll mold with the use of a metal sleeve.
Figure 2:
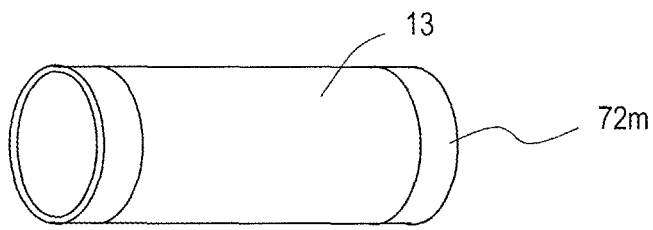
Figure 2:
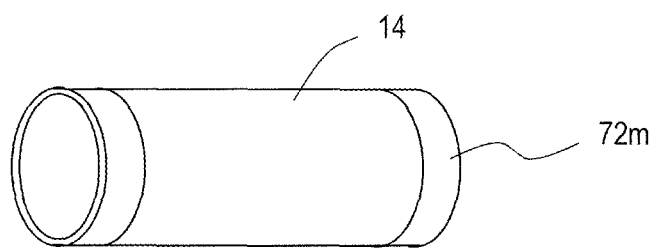
Figure 2:
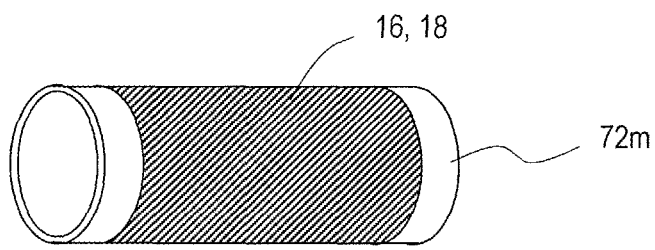
Figure 2:
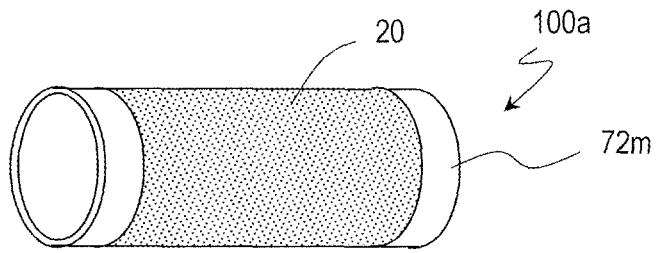

A method for manufacturing a roll mold with the use of a metal sleeve used in an experiment is briefly described with reference to FIG. 2.

Firstly, a metal sleeve 72m is provided as shown in FIG. 2(a).

Then, as shown in FIG. 2(b), an organic insulating layer 13 is formed on the outer perimeter surface of the metal sleeve 72m by electrodeposition, for example.

The electrodeposition may be, for example, a known electrodeposition painting method. For example, firstly, the metal sleeve 72m is washed. Then, the metal sleeve 72m is immersed in an electrodeposition bath in which an electrodeposition solution that contains an electrodeposition resin is stored. In the electrodeposition bath, an electrode is installed. When the insulative resin layer is formed by means of cationic electrodeposition, an electric current is allowed to flow between the metal sleeve 72m and the anode, where the metal sleeve 72m serves as the cathode and the electrode installed in the electrodeposition bath serves as the anode, so that the electrodeposition resin is deposited on the outer perimeter surface of the metal sleeve 72m, whereby the insulative resin layer is formed. When the insulative resin layer is formed by means of anionic electrodeposition, an electric current is allowed to flow, where the metal sleeve 72m serves as the anode and the electrode installed in the electrodeposition bath serves as the cathode, whereby the insulative resin layer is formed. Thereafter, the washing step and the baking step are performed, whereby an organic insulating layer 13 is formed. The electrodeposition resin used may be, for example, a polyimide resin, an epoxy resin, an acrylic resin, a melamine resin, a urethane resin, or a mixture thereof. The organic insulating layer 13 can be formed by forming an insulative resin layer using a various coating method other than electrodeposition and, when necessary, curing the insulative resin layer. The organic insulating layer 13 has a high surface flattening effect and can prevent scars or the like in the surface of the metal sleeve 72m, for example, being reflected in the surface shape of the aluminum alloy layer 18.

Then, as shown in FIG. 2(c), an inorganic underlayer 14 is formed on the organic insulating layer 13. For example, a SiO$_2$ layer 14 which has a thickness of about 100 nm is formed.

Then, as shown in FIG. 2(d), the buffer layer 16 and the aluminum alloy layer 18 are continuously formed. The same target is used for formation of the buffer layer 16 and the aluminum alloy layer 18. Therefore, the proportion of aluminum and the metal element M is constant in the buffer layer 16 and the aluminum alloy layer 18. The thickness of the buffer layer 16 is, for example, about 100 nm. The thickness of the aluminum alloy layer 18 is about 1 μm. The process continuing from formation of the inorganic underlayer 14 to formation of the aluminum alloy layer 18 is carried out by a thin film deposition method (e.g., sputtering). The entirety of this process is preferably carried out in the same chamber.

Then, anodization and etching are alternately and repeatedly performed on a surface of the aluminum alloy layer so as to form a porous alumina layer 20 which has a plurality of minute recessed portions, whereby a mold 100a is obtained as shown in FIG. 2(e).

Figure 3:
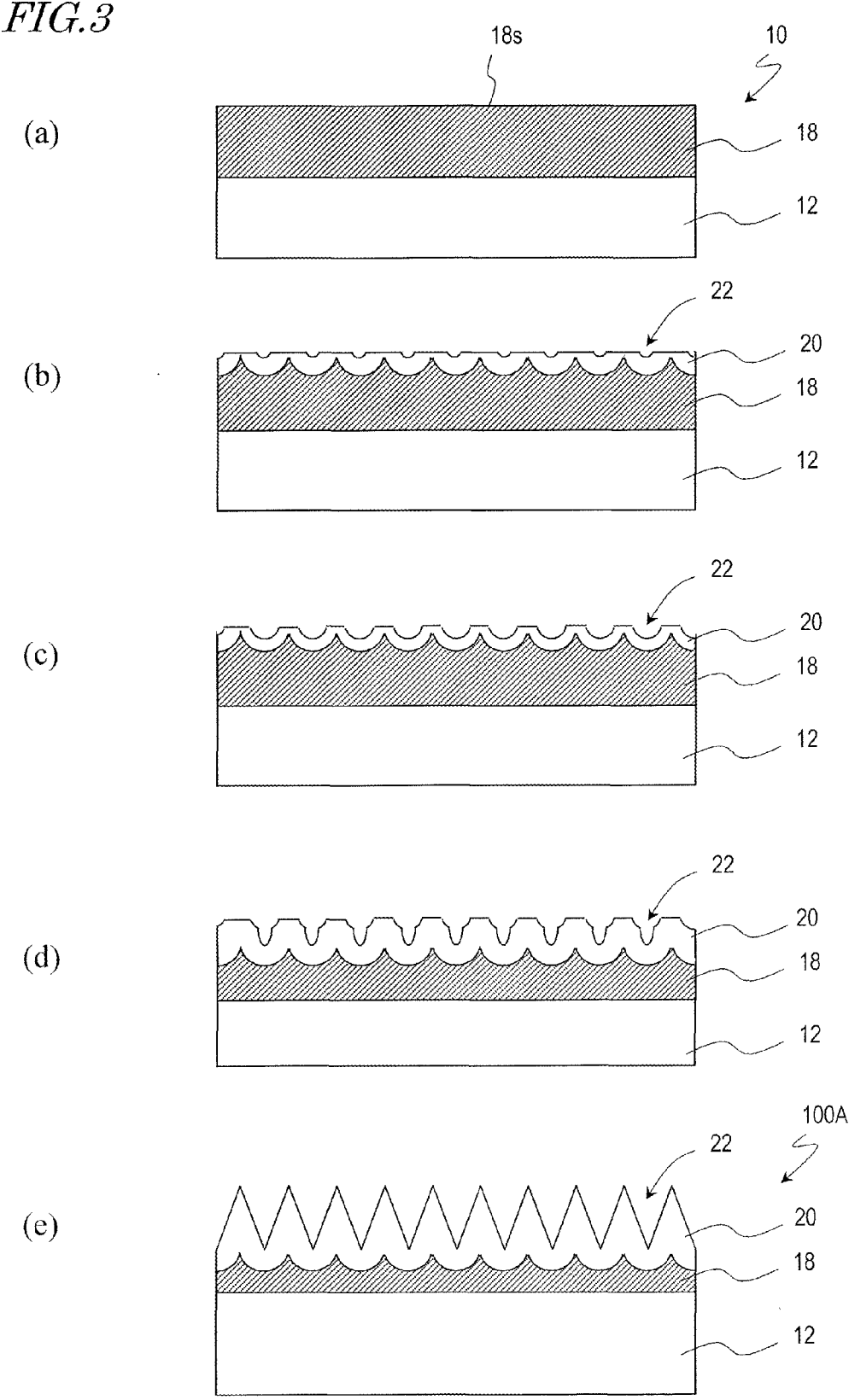
FIG. 3 (a) to (e) are diagrams showing the steps of a method for manufacturing a mold which has a porous alumina layer.

Next, a method for forming the porous alumina layer 20 is described with reference to FIG. 3. In FIG. 3, as the mold base 10 shown, the aluminum alloy layer 18 is directly provided on a support 12.

First, the mold base 10 is provided as shown in FIG. 3(a). The mold base 10 includes a metal base, an organic insulating layer 13 provided on the metal base, and an aluminum alloy layer 18 deposited on the organic insulating layer 13.

Then, a surface of the mold base 10 (a surface 18s of the aluminum alloy layer 18) is anodized to form a porous alumina layer 20 which has a plurality of minute recessed portions 22 (micropores) as shown in FIG. 3(b). The porous alumina layer 20 includes a porous layer which has the minute recessed portions 22 and a barrier layer. The porous alumina layer 20 may be formed by, for example, anodizing the surface 18s in an acidic electrolytic solution. The electrolytic solution used in the step of forming the porous alumina layer 20 may be, for example, an aqueous solution which contains an acid selected from the group consisting of oxalic acid, tartaric acid, phosphoric acid, chromic acid, citric acid, and malic acid. By modifying the anodization conditions (e.g., the type of the electrolytic solution, the applied voltage), the interpore distance, the depth of the micropores, the shape of the micropores, etc., can be adjusted. Note that the thickness of the porous alumina layer may be changed when necessary. The aluminum alloy layer 18 may be entirely anodized.

Then, the porous alumina layer 20 is brought into contact with an alumina etchant such that a predetermined amount is etched away, whereby the pore diameter of the minute recessed portions 22 is increased as shown in FIG. 3(c). Here, wet etching may be employed such that the pore wall and the barrier layer can be generally isotropically etched. By modifying the type and concentration of the etching solution and the etching duration, the etching amount (i.e., the size and depth of the minute recessed portions 22) can be controlled. The etching solution used may be, for example, an aqueous solution of 10 mass % phosphoric acid or organic acid, such as formic acid, acetic acid, citric acid, or the like, or a chromium-phosphoric acid mixture solution.

Then, the aluminum alloy layer 18 is again partially anodized such that the minute recessed portions 22 are grown in the depth direction and the thickness of the porous alumina layer 20 is increased as shown in FIG. 3(d). Here, the growth of the minute recessed portions 22 starts at the bottoms of the previously-formed minute recessed portions 22, and accordingly, the lateral surfaces of the minute recessed portions 22 have stepped shapes.

Thereafter, when necessary, the porous alumina layer 20 may be brought into contact with an alumina etchant to be etched such that the pore diameter of the minute recessed portions 22 is further increased. The etching solution used in this step may preferably be the above-described etching solution. Practically, the same etching bath may be used.

In this way, by repeating the anodization step and the etching step as described above, the moth-eye mold 100A that includes the porous alumina layer 20 which has a desired uneven shape is obtained as shown in FIG. 3(e). By modifying the conditions, the duration, and the number of cycles of the anodization step and the etching step, the lateral surfaces of the minute recessed portions 22 can have a stepped surface or can have a smooth curved surface or slope surface.

Next, a method for producing an antireflection film with the use of a roll-shaped moth-eye mold of an embodiment of the present invention is described. The roll-shaped mold has such an advantageous that, by spinning the roll-shaped mold around the axis, the surface structure of the mold can be continuously transferred to a work (an object which has a surface over which an antireflection film is to be formed).

The antireflection film production method of an embodiment of the present invention includes the steps of: providing the above-described mold; providing a work; irradiating a photocurable resin interposed between the mold and a surface of the work with light, thereby curing the photocurable resin; and peeling off the mold from an antireflection film which is formed by the cured photocurable resin.

When a roll-shaped film is used as the work, an antireflection film can be produced by a roll-to-roll method. It is preferred that the film includes a base film and a hard coat layer provided on the base film, and the antireflection film is provided on the hard coat layer. As the base film, for example, a TAC (triacetyl cellulose) film may be preferably used. As the hard coat layer, for example, an acrylic hard coat material may be used.

Figure 4:
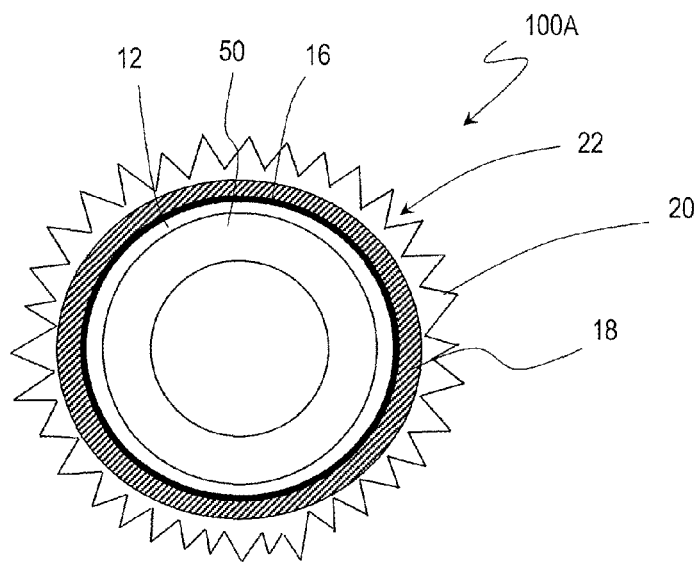
FIG. 4 A cross-sectional view schematically showing the configuration of a mold 100A which has a metal sleeve 72m.

The metal sleeve 72m of the mold 100a shown in FIG. 2(e) readily deforms, and therefore, it is difficult to use the mold 100a as it is. In view of such, a core member 50 is inserted inside the metal sleeve 72m of the mold 100a as shown in FIG. 4, whereby a mold 100A is obtained which can be used in an antireflection film production method according to a roll-to-roll method. Note that the mold 100A shown in FIG. 4 has a buffer layer 16 which is provided on the support 12.

Figure 5:
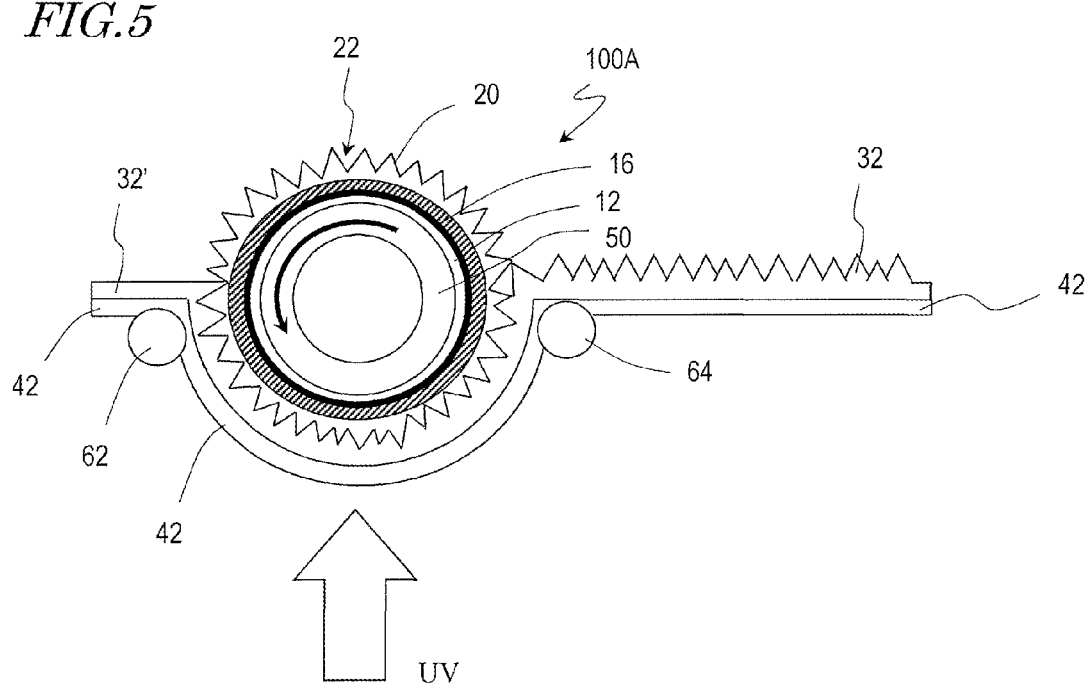
FIG. 5 A schematic diagram for illustrating a method for producing an antireflection film according to an embodiment of the present invention.

Next, an antireflection film production method of an embodiment of the present invention is described with reference to FIG. 5. FIG. 5 is a schematic cross-sectional view for illustrating a method for producing an antireflection film according to a roll-to-roll method. Firstly, a moth-eye mold 100A in the form of a roll, which is shown in FIG. 4, is provided.

Then, as shown in FIG. 5, a work 42 over which a UV-curable resin 32' is applied on its surface is maintained pressed against the moth-eye mold 100A, and the UV-curable resin 32' is irradiated with ultraviolet (UV) light such that the UV-curable resin 32' is cured. The UV-curable resin 32' used may be, for example, an acrylic resin. The work 42 may be, for example, a TAC (triacetyl cellulose) film. The work 42 is fed from an unshown feeder roller, and thereafter, the UV-curable resin 32' is applied over the surface of the work 42 using, for example, a slit coater or the like. The work 42 is supported by supporting rollers 62 and 64 as shown in FIG. 5. The supporting rollers 62 and 64 have rotation mechanisms for carrying the work 42. The moth-eye mold 100A in the form of a roll is rotated at a rotation speed corresponding to the carrying speed of the work 42 in a direction indicated by the arrow in FIG. 5.

Thereafter, the moth-eye mold 100A is separated from the work 42, whereby a cured material layer 32 to which an uneven structure of the moth-eye mold 100A (inverted moth-eye structure) is transferred is formed on the surface of the work 42. The work 42 which has the cured material layer 32 formed on the surface is wound up by an unshown winding roller.

In the example described hereinabove, a metal sleeve is used as the metal base, although an aluminum base in a bulk form may be used instead of the metal sleeve.

Next, a method for manufacturing a moth-eye mold of an embodiment of the present invention is described in more detail based on a specific experimental example. Firstly, a method for forming an aluminum alloy layer is described with reference to FIG. 6.

Figure 6:
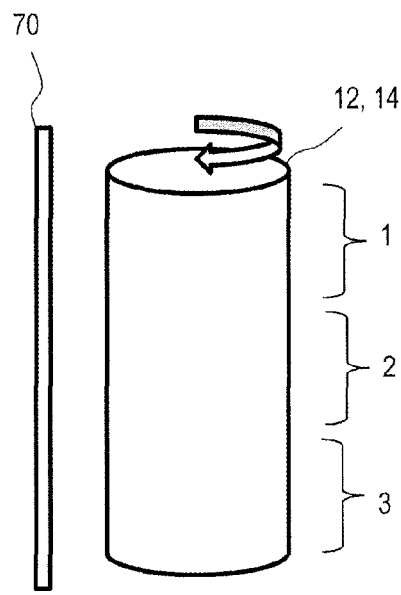
FIG. 6 A schematic diagram for illustrating a method for forming an aluminum alloy layer in an experimental example.

As shown in FIG. 6, a support 12 is provided which includes a metal sleeve that is made of nickel and an organic insulating layer that is provided on the outer perimeter surface of the metal sleeve, and an inorganic underlayer 14 is formed on the support 12. The nickel metal sleeve used had a length of 1470 mm and a diameter of 300 mm. The organic insulating layer was formed by electrodeposition using an acrylic melamine resin. The thickness of the organic insulating layer was 7 μm. The inorganic underlayer 14 used was a 100 nm thick $SiO_2$ layer.

As the target 70 for formation of the buffer layer and the aluminum alloy layer, a 0.5 mass % Ti (titanium) containing aluminum alloy target, a 1.0 mass % Nd (neodymium) containing aluminum alloy target, and a 0.5 mass Cu (copper) containing aluminum alloy target were prepared. Further, for the sake of comparison, a target of a pure aluminum (not less than 99.99 mass %) was prepared.

As the buffer layer, a 20 nm thick oxygen-containing layer (AlTiOx layer, AlNdOx layer, AlCuOx layer, or AlOx layer) was formed. The oxygen content was continuously varied from 5 at % to 0 at %. The aluminum alloy layer and the aluminum layer both had a thickness of 1 μm, for which 20 layers each having a thickness of 50 nm were formed with time intervals therebetween.

For the obtained aluminum alloy layer and aluminum layer, the presence/absence of abnormal grains was evaluated by the spectral reflectance (400 nm to 700 nm) and SEM observation, and the resistance to the etching solution (phosphoric acid: 1 mol/L, 30° C.) was evaluated by variations in adhesion and electric characteristics. The adhesion was evaluated by an adhesive tape and a crosscut test.

The roll-shaped mold was divided into three parts (1, 2 and 3) shown in FIG. 6, and each region was evaluated. Note that, in SEM observation and measurement of the electric resistance, glass substrates were used which were placed at positions respectively corresponding to the three parts 1, 2 and 3 of the roll-shaped mold shown in FIG. 6. The electric resistance was measured by a four-terminal method using a Loresta AP manufactured by Mitsubishi Chemical Corporation.

A moth-eye mold was manufactured using a mold base which has an aluminum alloy layer or aluminum layer under the following conditions:

Electrolytic solution for anodization: oxalic acid, 0.025 mol/L, 5° C.

Etching solution: phosphoric acid, 1 mol/L, 30° C.

Anodization duration: 39 seconds

Etching duration: 16 minutes 40 seconds

Under the above conditions, the anodization step and the etching step were alternately carried out such that the anodization step was carried out seven cycles and the etching step was carried out six cycles. This process ended with the anodization step.

First, for the sake of comparison, the results of an experimental example in which an aluminum layer was used are described.

Figure 7:
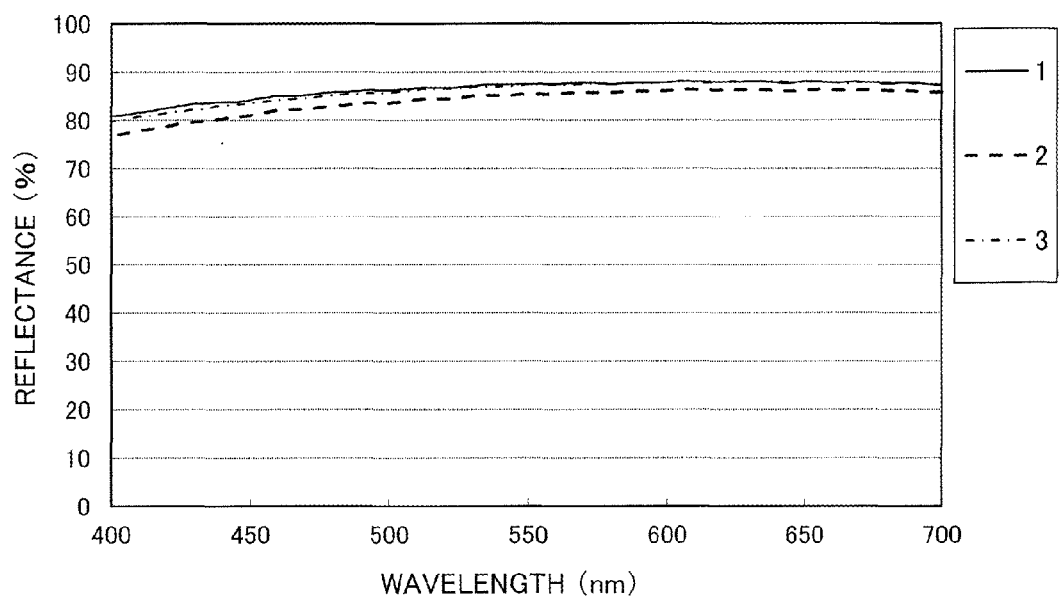
FIG. 7 A graph of the spectral reflectance of an aluminum layer.

FIG. 7 shows a graph of the spectral reflectance of the aluminum layer. The aluminum layer exhibited high reflectances in the wavelength range of 400 nm to 700 nm. However, the reflectance of the part 2 of the roll-shaped mold (see FIG. 6) was lower than 80%.

Figure 8:
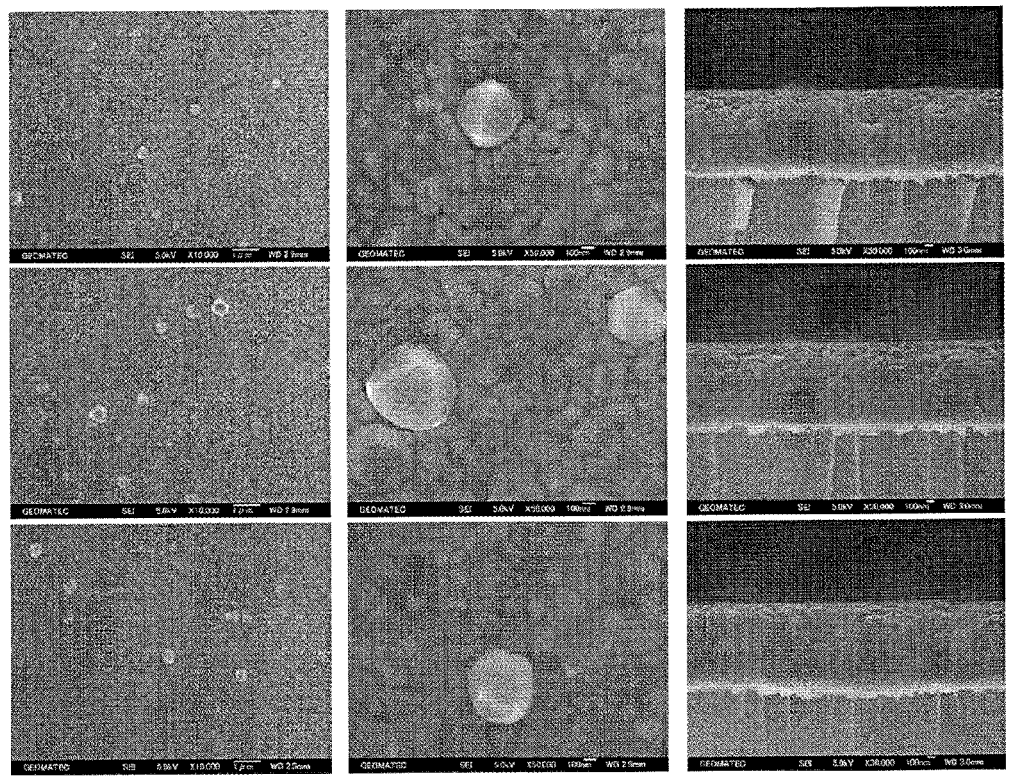
FIG. 8 SEM images of an aluminum layer formed on a glass substrate.

FIG. 8 shows SEM images of the aluminum layer on the glass substrate. The images of the upper, middle and lower rows correspond to the part 1, part 2 and part 3 of the roll-shaped mold. The left column shows SEM images (×10000) of the surface. The middle column shows SEM images (×50000) of the surface. The right column shows SEM images (×30000) of a cross section.

As seen from the SEM images of the surface, abnormal grains are dispersedly present. It is inferred that these abnormal grains scattered light, and as a result, the reflectance decreased.

FIGS. 9(a) and 9(b) show SEM images (×20000) of a porous alumina layer formed from the aluminum layer. FIG. 9(a) shows a SEM image of the surface. FIG. 9(b) shows a SEM image of a cross section.

As seen from FIG. 9(a), a peculiar structure was formed in a minute recessed portion of the porous alumina layer (indicated by a circle (◯)). It is inferred that this peculiar structure is attributed to abnormal grains which were present in the aluminum layer. Note that the depth of the minute recessed portions of this porous alumina layer was about 390 nm.

It was found from the evaluation by means of adhesion and variation in the electric resistance (between the initial value and the value obtained after immersion in the etching solution for 100 minutes) that there was no problem in the resistance to the etching solution. Note that the electric resistance increased by about 50% because immersion in the etching solution for 100 minutes reduced the aluminum layer. This was employed as a criterion for evaluating the etching solution resistance of the aluminum alloy layer by means of the electric resistance.

Figure 10:
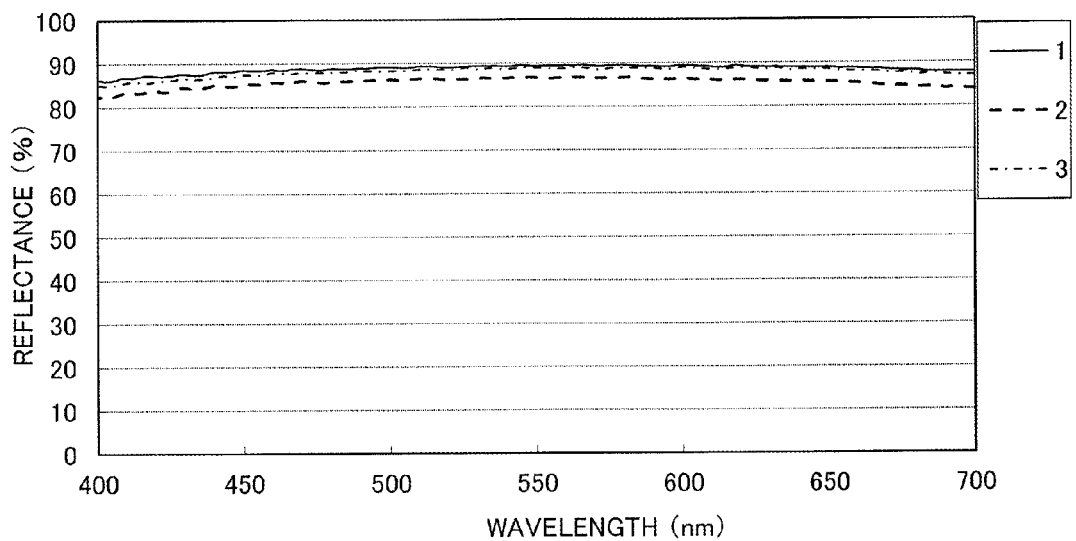
FIG. 10 A graph of the spectral reflectance of a Ti-containing aluminum alloy layer.

Next, FIG. 10 shows a graph of the spectral reflectance of a Ti-containing aluminum alloy layer. It had a reflectance of higher than 80% in the wavelength range of 400 nm to 700 nm.

Figure 11:
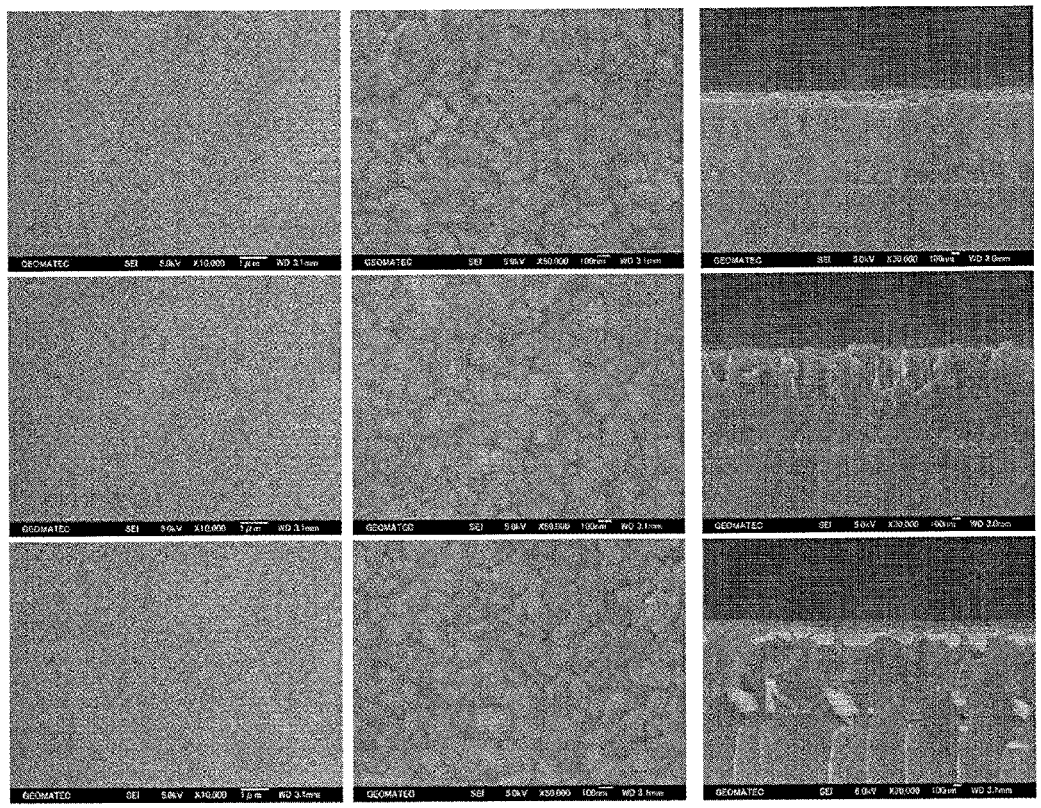
FIG. 11 SEM images of a Ti-containing aluminum alloy layer formed on a glass substrate.

FIG. 11 shows SEM images of the Ti-containing aluminum alloy layer on the glass substrate. The images of the upper, middle and lower rows correspond to the part 1, part 2 and part 3 of the roll-shaped mold. The left column shows SEM images (×10000) of the surface. The middle column shows SEM images (×50000) of the surface. The right column shows SEM images (×30000) of a cross section.

As clearly seen from the comparison between the SEM images of the surface of FIG. 11 and the SEM images of the aluminum layer shown in FIG. 8, no abnormal grains are seen in the SEM images of the surface of FIG. 11. As a result, it is inferred that the Ti-containing aluminum alloy layer had a higher reflectance than the aluminum layer.

FIGS. 12(a) and 12(b) show SEM images (×20000) of a porous alumina layer formed from the Ti-containing aluminum alloy layer. FIG. 12(a) shows a SEM image of the surface. FIG. 12(b) shows a SEM image of a cross section.

Figure 9:
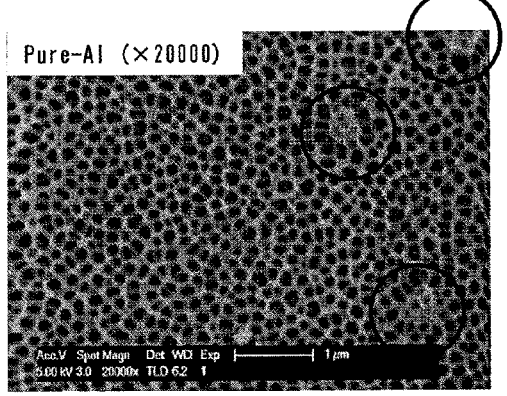
FIGS. 9 (a) and (b) are SEM images (×20000) of a porous alumina layer formed from the aluminum layer.
Figure 9:
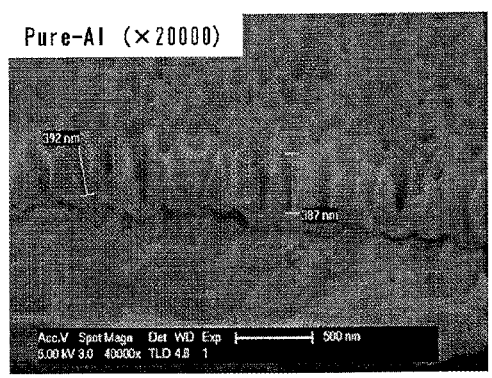
Figure 12:
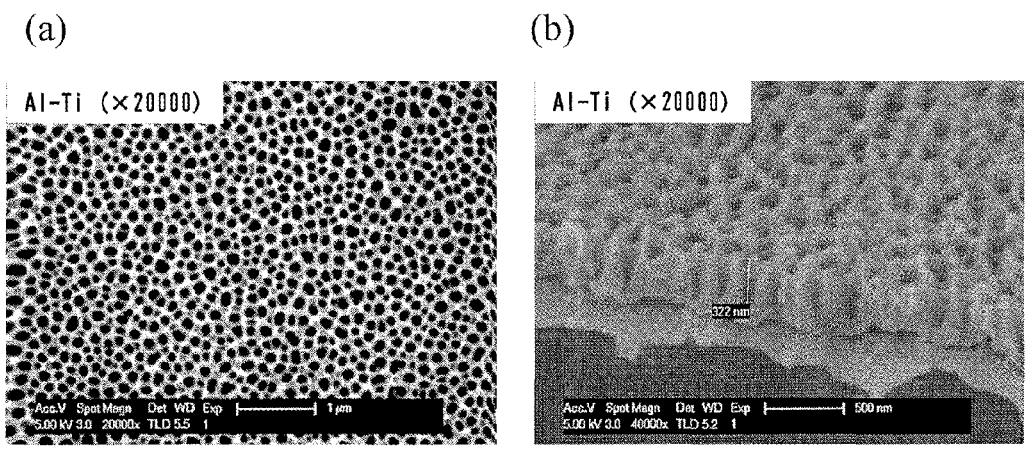
FIGS. 12 (a) and (b) are SEM images (×20000) of a porous alumina layer formed from the Ti-containing aluminum alloy layer.

As clearly seen from the comparison between FIG. 12 and FIG. 9, a peculiar structure such as seen in FIG. 9(a) is not seen in FIG. 12(a). This is probably because the Ti-containing aluminum alloy layer includes no abnormal grains, and the Ti-containing aluminum alloy layer has a uniform structure. Note that the depth of the minute recessed portions of this porous alumina layer was about 330 nm.

It was found from the evaluation by means of adhesion and variation in the electric resistance (between the initial value and the value obtained after immersion in the etching solution for 100 minutes) that there was no problem in the resistance to the etching solution. Note that, when immersed in the etching solution for 100 minutes, the electric resistance increased by about 80%. Although this is slightly larger than the variation in electric resistance of the aluminum alloy layer, it can be judged that there is no problem of galvanic corrosion.

Figure 13:
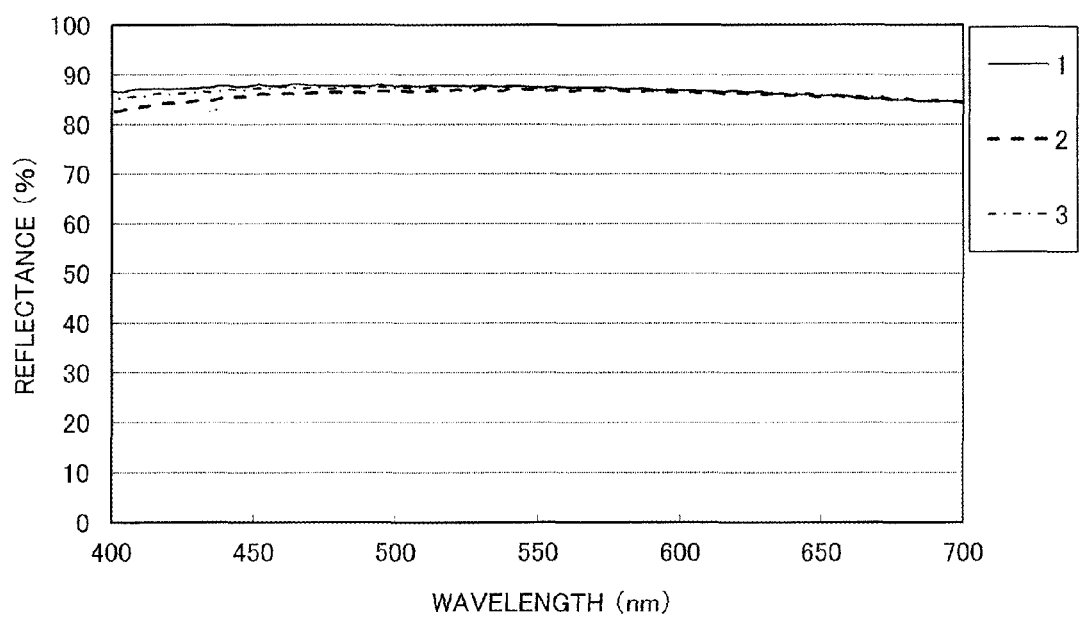
FIG. 13 A graph of the spectral reflectance of a Nd-containing aluminum alloy layer.

Next, FIG. 13 shows a graph of the spectral reflectance of a Nd-containing aluminum alloy layer. It had a reflectance of higher than 80% in the wavelength range of 400 nm to 700 nm.

Figure 14:
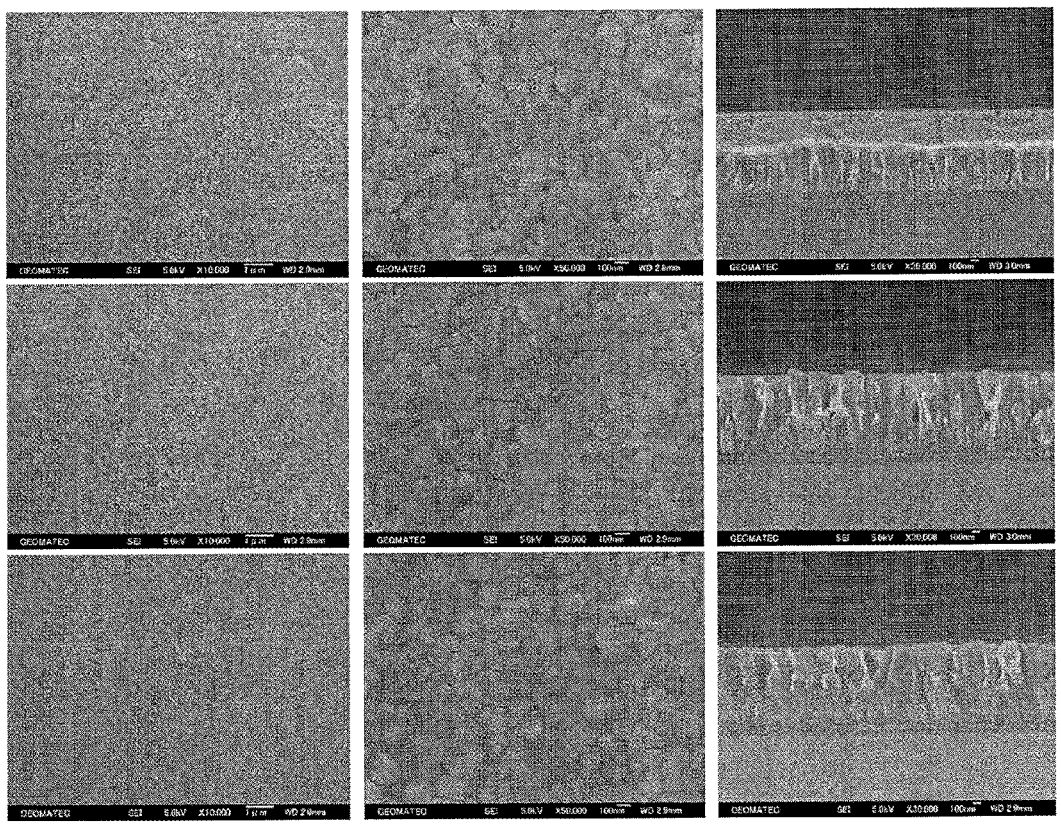
FIG. 14 SEM images of a Nd-containing aluminum alloy layer formed on a glass substrate.

FIG. 14 shows SEM images of the Nd-containing aluminum alloy layer on the glass substrate. The images of the upper, middle and lower rows correspond to the part 1, part 2 and part 3 of the roll-shaped mold. The left column shows SEM images (×10000) of the surface. The middle column shows SEM images (×50000) of the surface. The right column shows SEM images (×30000) of a cross section.

As clearly seen from the comparison between the SEM images of the surface of FIG. 14 and the SEM images of the aluminum layer shown in FIG. 8, no abnormal grains are seen in the SEM images of the surface of FIG. 14. As a result, it is inferred that the Nd-containing aluminum alloy layer had a higher reflectance than the aluminum layer.

FIGS. 15(a) and 15(b) show SEM images (×20000) of a porous alumina layer formed from the Nd-containing aluminum alloy layer. FIG. 15(a) shows a SEM image of the surface. FIG. 12(b) shows a SEM image of a cross section.

Figure 15:
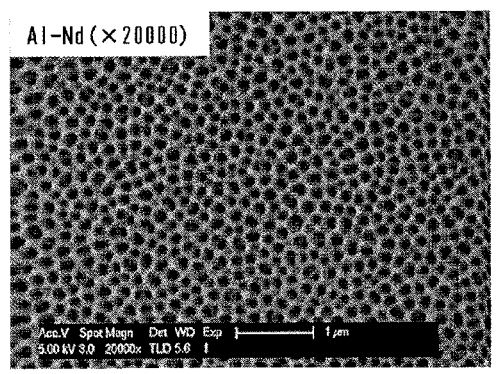
FIGS. 15 (a) and (b) are SEM images (×20000) of a porous alumina layer formed from the Nd-containing aluminum alloy layer.
Figure 15:
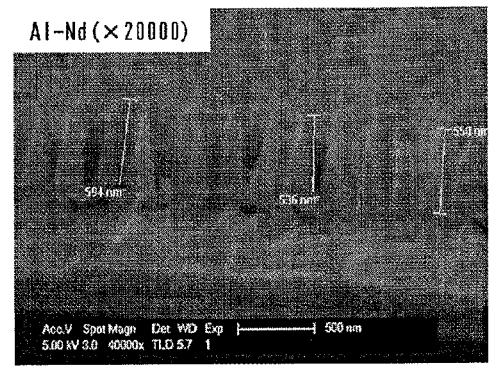

As clearly seen from the comparison between FIG. 15 and FIG. 9, a peculiar structure such as seen in FIG. 9(a) is not seen in FIG. 15(a). This is probably because the Nd-containing aluminum alloy layer includes no abnormal grains, and the Nd-containing aluminum alloy layer has a uniform structure. Note that the depth of the minute recessed portions of this porous alumina layer was about 550 nm.

It was found from the evaluation by means of adhesion and variation in the electric resistance (between the initial value and the value obtained after immersion in the etching solution for 100 minutes) that there was no problem in the resistance to the etching solution. Note that, when immersed in the etching solution for 100 minutes, the electric resistance increased by about 50%. This is equivalent to the variation in electric resistance of the aluminum alloy layer, and it can be judged that there is no problem of galvanic corrosion.

Figure 16:
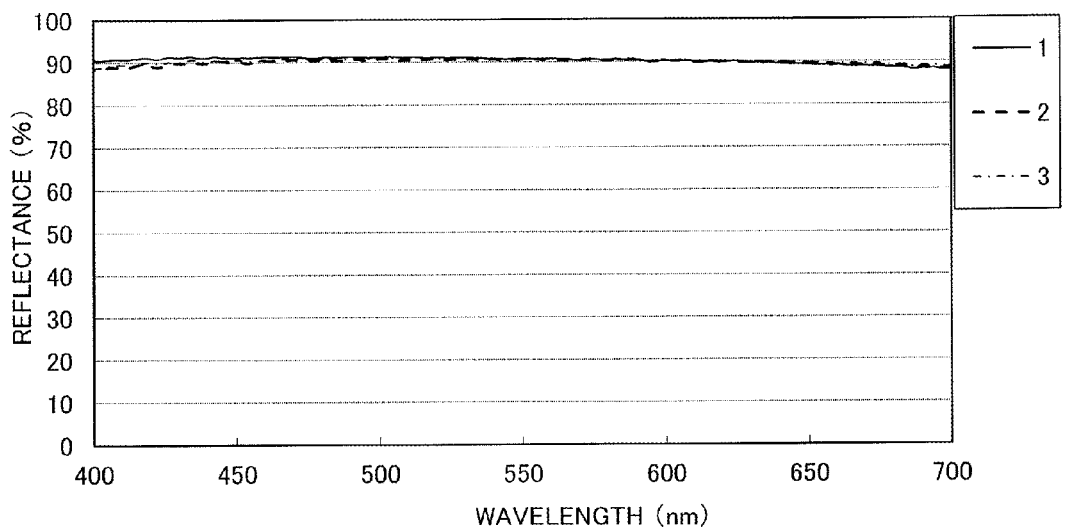
FIG. 16 A graph of the spectral reflectance of a Cu-containing aluminum alloy layer.

Next, FIG. 16 shows a graph of the spectral reflectance of a Cu-containing aluminum alloy layer. It had a reflectance of higher than 80% in the wavelength range of 400 nm to 700 nm. At almost all of the wavelengths, it exhibited reflectances near 90%.

Figure 17:
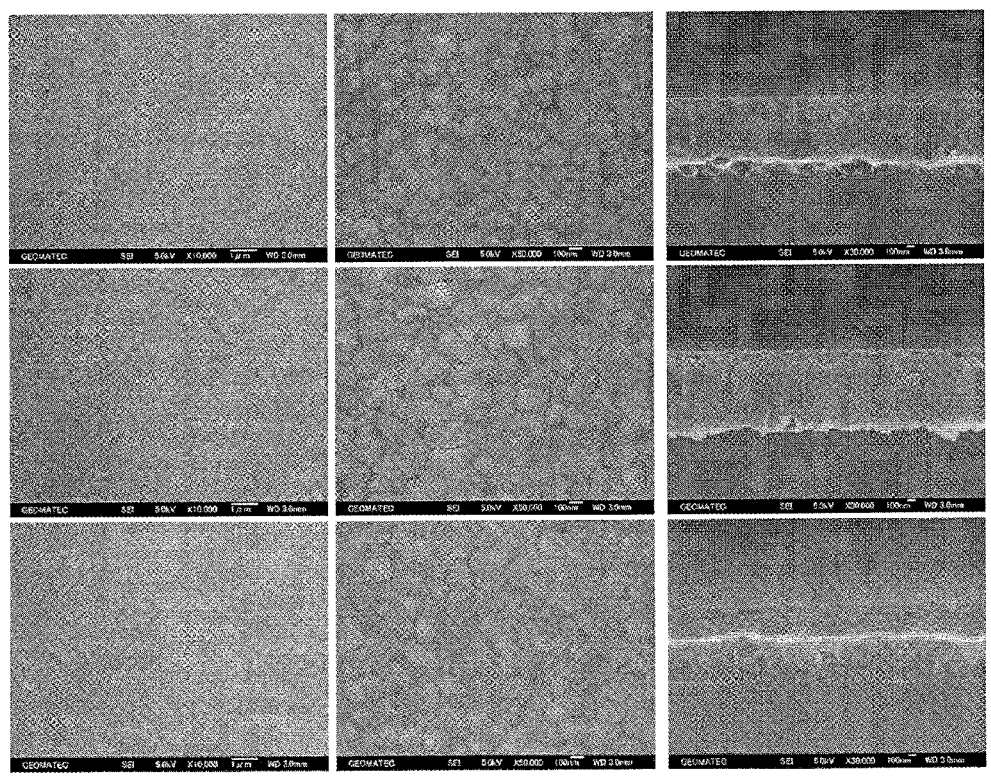
FIG. 17 SEM images of a Cu-containing aluminum alloy layer formed on a glass substrate.

FIG. 17 shows SEM images of the Cu-containing aluminum alloy layer on the glass substrate. The images of the upper, middle and lower rows correspond to the part 1, part 2 and part 3 of the roll-shaped mold. The left column shows SEM images (×10000) of the surface. The middle column shows SEM images (×50000) of the surface. The right column shows SEM images (×30000) of a cross section.

As clearly seen from the comparison between the SEM images of the surface of FIG. 17 and the SEM images of the aluminum layer shown in FIG. 8, no abnormal grains are seen in the SEM images of the surface of FIG. 17. As a result, it is inferred that the Cu-containing aluminum alloy layer had a higher reflectance than the aluminum layer.

FIGS. 18(a) and 18(b) show SEM images (×20000) of a porous alumina layer formed from the Cu-containing aluminum alloy layer. FIG. 18(a) shows a SEM image of the surface. FIG. 18(b) shows a SEM image of a cross section.

Figure 18:
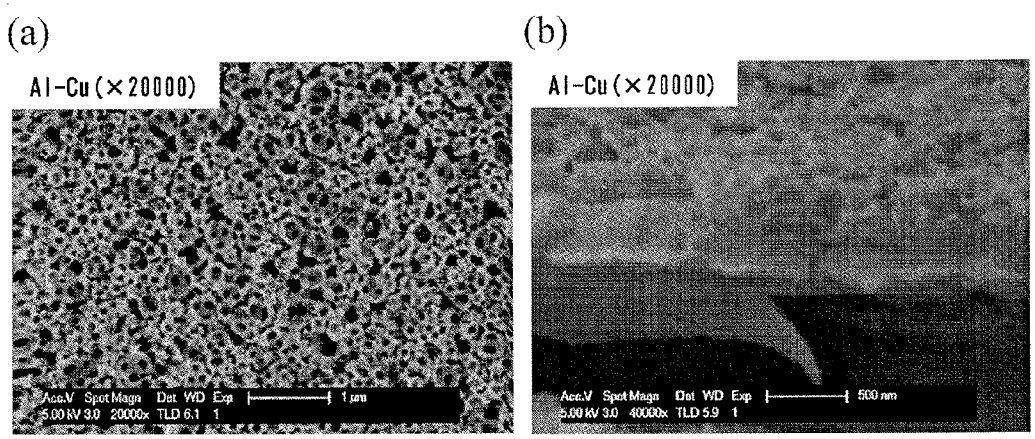
FIGS. 18 (a) and (b) are SEM images (×20000) of a porous alumina layer formed from the Cu-containing aluminum alloy layer.

As seen from FIG. 18, the porous alumina layer formed from the Cu-containing aluminum alloy layer did not have a form which could be used for production of an antireflection film. This is probably because the Cu-containing aluminum alloy layer is more likely to be etched away.

Although there was no problem in adhesion, the electric resistance increased by more than about 600% when immersed in the etching solution for 100 minutes. This is probably because, when the Cu-containing aluminum alloy layer was brought into contact with the etching solution, galvanic corrosion occurred, and the Cu-containing aluminum alloy layer was quickly dissolved.

As seen from the above experimental results, in an aluminum alloy layer that contains Ti (standard electrode potential: −1.630 V) or Nd (standard electrode potential: −2.32 V), production of abnormal grains is prevented, and galvanic corrosion would not occur. Since the standard electrode potential of aluminum is −1.676 V (about −1.68 V), it can be said that the above-described effect can be obtained so long as the absolute value of the difference from the standard electrode potential of aluminum is not more than about 0.64 V (2.32-1.68). Of the metal elements shown in FIG. 19, ones which meet this condition are Ti, Nd, Mn, Mg, Zr, V and Pb. As for these elements, a target of 0.5 mass % to 2.0 mass % for the Ti-containing aluminum alloy, a target of 1.0 mass % to 9.9 mass % for the Nd-containing aluminum alloy, a target of 2.0 mass % for the Zr-containing aluminum alloy, and a target of 2 at % (about 4 mass %) for the Mn-containing aluminum alloy are commercially available and therefore can be industrially used as of now.

The content of the metal element M in the aluminum alloy layer is not particularly limited but preferably does not exceed 10 mass %. If it exceeds 10 mass %, a desired porous alumina layer cannot be obtained in some cases.

Although in the above-described example the aluminum alloy layer is formed on the organic insulating layer, the same effects can also be obtained when the aluminum alloy layer is formed on a metal base or glass base. As described above, when the aluminum alloy layer is formed on the organic insulating layer, the organic insulating layer has a low thermal conductivity, and particularly, abnormal grains are likely to be formed. Therefore, the effect achieved by using the aluminum alloy layer is large. In the case of forming a 1 μm thick aluminum alloy layer, it is preferred that the formation process is interrupted every time an aluminum alloy layer having a thickness of 50 nm, for example, is deposited as described above such that the aluminum alloy layer 18 having a thickness of about 1 μm, which consists of 20 aluminum alloy layers each having a thickness of 50 nm, is obtained. Using the aluminum alloy layer makes formation of a uniform layer easier. Therefore, the number of interruptions can be reduced as compared with formation of an aluminum layer, and the mass productivity can be improved.

INDUSTRIAL APPLICABILITY

The present invention relates to a mold manufacturing method and, particularly, is widely applicable to a method for manufacturing a mold which has a porous alumina layer over its surface.

REFERENCE SIGNS LIST 10 mold base
12 support
13 organic insulating layer
14 inorganic underlayer
16 buffer layer
18 aluminum alloy layer
18s surface
20 porous alumina layer
22 minute recessed portion
32 cured material layer
32' UV-curable resin
42 work
50 core member
62 supporting roller
70 target
72m metal sleeve (metal base)
100, 100a, 100A 100A moth-eye mold

The invention claimed is:

1. A method for manufacturing a mold which has an inverted moth-eye structure over its surface, the inverted moth-eye structure having a plurality of recessed portions whose two-dimensional size viewed in a direction normal to its surface is not less than 10 nm and less than 500 nm, the method comprising the steps of:
    (a) providing a mold base, the mold base including a metal base, an organic insulating layer provided on the metal base, and an aluminum alloy layer provided on the organic insulating layer, the aluminum alloy layer containing aluminum and a non-aluminum metal element M, an absolute value of a difference between a standard electrode potential of the metal element M and a standard electrode potential of aluminum being not more than 0.64 V, and a content of the metal element M in the aluminum alloy layer not exceeding 10 mass %;
    (b) partially anodizing the aluminum alloy layer to form a porous alumina layer which has a plurality of minute recessed portions;
    (c) after step (b), bringing the porous alumina layer into contact with an etching solution, thereby enlarging the plurality of minute recessed portions of the porous alumina layer; and
    (d) after step (c), further performing anodization to grow the plurality of minute recessed portions, wherein the mold base further includes an inorganic underlayer interposed between the organic insulating layer and the aluminum alloy layer, and wherein the mold base further includes a buffer layer interposed between the inorganic underlayer and the aluminum alloy layer, the buffer layer containing aluminum, the metal element M, and either of oxygen or nitrogen.

2. The method of claim 1, wherein the metal element M is a metal element which is nobler than aluminum.

3. The method of claim 1, wherein the metal element M is a metal element which is less noble than aluminum.

4. The method of claim 1, wherein the buffer layer has such a profile that the contents of aluminum and the metal element M in the buffer layer are higher in a portion which is closer to the aluminum alloy layer than in another portion which is closer to the inorganic underlayer.

5. The method of claim 1, wherein the inorganic underlayer is a silicon oxide layer or a titanium oxide layer.

6. The method of claim 1, wherein the organic insulating layer is an electrodeposition layer.

7. The method of claim 1, wherein the metal base is in the form of a hollow cylinder, and the organic insulating layer is provided over an outer perimeter surface of the hollow cylinder of the metal base.

8. The method of claim 1, wherein step (b) and step (c) are further performed after step (d).

9. A method for producing an antireflection film, comprising the steps of:
    providing a mold which is manufactured according to the manufacturing method of claim 1;
    providing a work;
    irradiating a photocurable resin interposed between the mold and a surface of the work with light, thereby curing the photocurable resin; and
    peeling off the mold from an antireflection film which is formed by the cured photocurable resin.

* * * * *